United States Patent
Büdenbender

Patent Number: 5,205,468
Date of Patent: Apr. 27, 1993

[54] BUTT WELDING SHEETS

[76] Inventor: Bernd Büdenbender, Schubertweg 5, 2160 Stade, Fed. Rep. of Germany

[21] Appl. No.: 498,585

[22] Filed: Mar. 23, 1990

[30] Foreign Application Priority Data

Mar. 23, 1989 [DE] Fed. Rep. of Germany ....... 3909620

[51] Int. Cl.⁵ .............................................. B23K 26/00
[52] U.S. Cl. .................................... 228/164; 228/170; 228/173.7; 219/121.14; 219/121.64; 156/304.1
[58] Field of Search ............... 156/304.1, 304.3, 304.5, 156/304.6, 502, 505; 219/121.63, 121.64, 121.14; 228/164, 265, 170, 173.6, 173.7

[56] References Cited

U.S. PATENT DOCUMENTS 4,177,100 12/1979 Pennington ................... 156/304.6 X
4,577,088 3/1986 Sharp ............................... 219/121.63
4,883,937 11/1989 Matsuno et al. ................ 219/121.64

FOREIGN PATENT DOCUMENTS 3713527 11/1988 Fed. Rep. of Germany .
3901319 7/1989 Fed. Rep. of Germany .
555574 11/1943 United Kingdom ............. 156/304.6

Primary Examiner—David A. Simmons
Assistant Examiner—James J. Engel, Jr.
Attorney, Agent, or Firm—Herbert Dubno; Andrew Wilford

[57] ABSTRACT

Fusible sheet edges are joined by first forming each of the edges with a laterally projecting burr and then butting the edges together at a join line with both the burrs directed in the same lateral direction adjacent each other and plastically deforming the laterally projecting burrs at the join line in the lateral direction opposite their projection direction. Finally the edges are fused together at the join line. The burrs are plastically deformed by pressing them with a barrel-shaped roller that is moved along the join line.

8 Claims, 1 Drawing Sheet

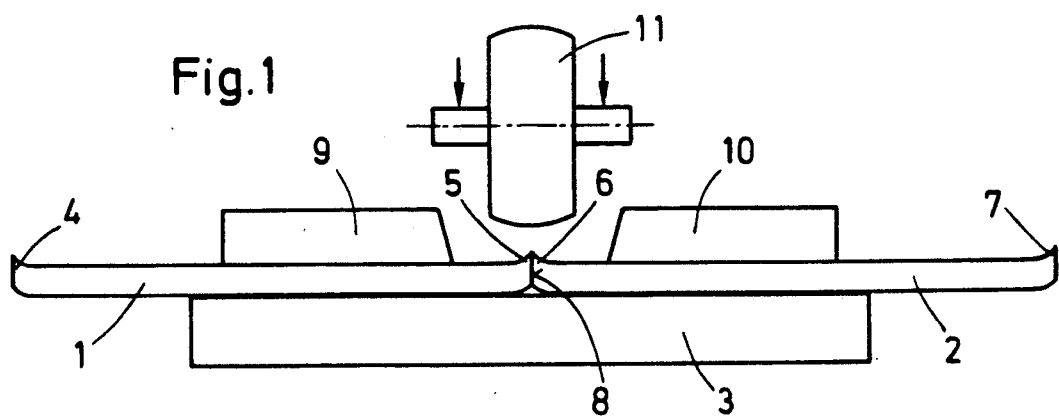
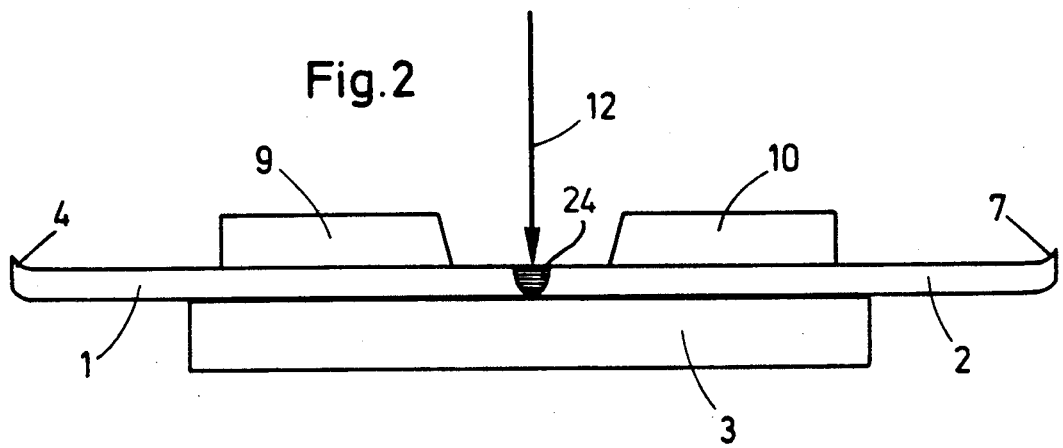
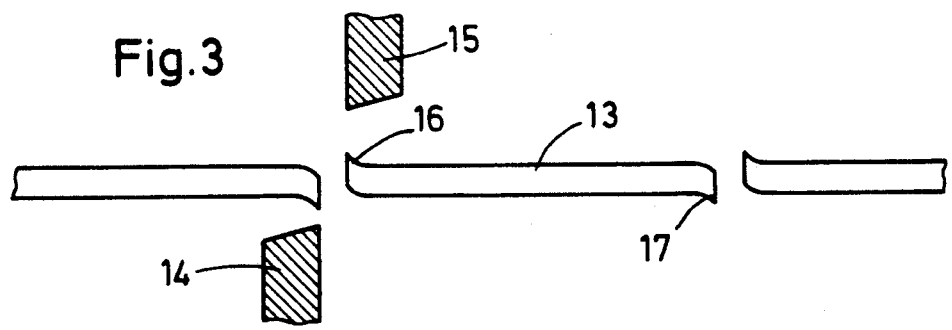
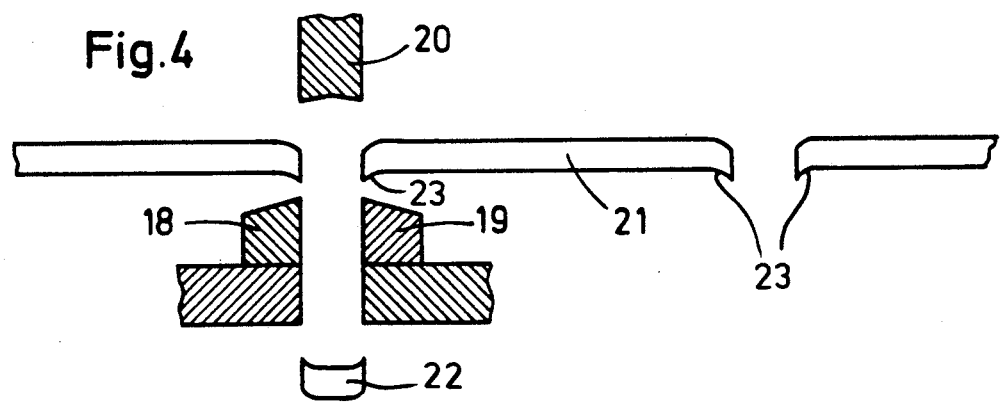

BUTT WELDING SHEETS

FIELD OF THE INVENTION

The present invention relates to a method of joining sheet workpieces. More particularly this invention concerns welding together the edges of metallic sheets

BACKGROUND OF THE INVENTION

In butt welding metallic sheets such as described in German patent document 3,713,527 it is necessary to avoid the formation of any gaps at the butted edges being welded, whether they are of two different workpieces or opposite edges of a single workpiece as in a tube-forming operation Accordingly the edges are formed as straight and square as possible, typically by shearing, and then are pressed together and held before welding heat is applied. If a gap is left that is as small as one-tenth the workpiece thickness the result can be a mechanically weak joint that in certain applications will create a leak. When the gap is larger a laser beam used to apply the heat might pass between the workpieces, preventing them from being fused together at all.

Accordingly it is known from German patent document 3,901,319 to overlap the workpiece edges slightly by a distance equal to the maximum possible variation of straightness of these edges. The overlapped edges are then flattened together by a roller or the like before welding, producing in regions of some overlap a workpiece thickness equal to 1.3 to 1.5 times the material thickness. Trying to reduce the thickness further damages the workpieces. This procedure therefore produces a thick unsightly weld where, due to varying material thickness, actual fusion will normally vary along the weld, being less in the thick regions and more in the regions where there is little or no overlap.

OBJECTS OF THE INVENTION

It is therefore an object of the present invention to provide an improved method for joining workpiece edges by butt welding.

Another object is the provision of such an improved method for joining workpiece edges by butt welding which overcomes the above-given disadvantages, that is which produces a smooth and perfectly continuous weld that is not thicker than the balance of the workpiece or workpieces.

SUMMARY OF THE INVENTION

A method of joining fusible sheet edges according to this invention comprises the steps of first forming each of the edges with a laterally projecting burr and then butting the edges together at a join line with both the burrs directed in the same lateral direction adjacent each other and plastically deforming the laterally projecting burrs at the join line in the lateral direction opposite their projection direction. Finally the edges are fused together at the join line.

The burr itself can be the burr formed by many machining operations in cutting a straight edge on a workpiece, particularly shearing. In locations where the edges do not quite meet, the burrs will be pressed together to fill the gap, ensuring a continuous weld, and in places where they abut, these burrs will just be flattened somewhat. In particular it is standard for the face of the workpiece opposite that face that has a burr to be bent in or chamfered somewhat, so in locations where the edges meet flatly, pushing in the burr will merely serve to eliminate the void on the opposite side at the join line.

According to another feature of this invention the burrs are plastically deformed by pressing them with a roller that is moved along the join line. The roller is barrel-shaped. Furthermore the edges are formed with burrs by shearing and the sheared edges are trimmed to form the burrs. This can be done by trimming two sheared edges to form burrs thereon simultaneously.

DESCRIPTION OF THE DRAWING

The above and other objects, features, and advantages will become more readily apparent from the following, reference being made to the accompanying drawing in which:

FIGS. 1 and 2 are largely schematic end views illustrating the welding method of this invention; and FIGS. 3 and 4 are end views illustrating how the workpieces can be sheared for welding according to this invention.

SPECIFIC DESCRIPTION

As seen in FIG. 1 a pair of sheet workpieces 1 and 2 are both held flat on a flat support table 3 by respective clamps 9 and 10 so that edges of these workpieces 1 and 2 butt at a join line 8. These workpieces 1 and 2 have at the join line burrs 5 and 6 which according to this invention both face laterally in the same direction, here upward away from the support table 3, and in fact they have opposite outer edges formed with identical such burrs 4 and 7 both also facing upward.

According to this invention after the workpieces 1 and 2 are thus clamped, with inevitably there being some voids formed at the join line 8, a roller 11 is pressed down and rolled along the burrs 5 and 6 at this join line 8. This causes the burrs to reenter, thereby squaring the respective workpiece edge where the workpieces 1 and 2 abut, and causes the burrs to fold inward and butt where there is a void.

Subsequently a laser beam such as illustrated at 12 in FIG. 2 is used to fuse the two edges together. The result is a perfect weld 24 that is of the same thickness as the adjacent workpieces.

FIG. 3 shows how a workpiece 13 can be formed by a standard pair of oppositely acting shear blades 15 and 16 with oppositely directed edge burrs 16 and 17. To join adjacent such edges of such workpieces 13 it is necessary to turn one of the workpieces 13 over to orient its edge burr so that is projects laterally in the same direction as that of the burr of the edge to which it is to be joined.

Alternately FIG. 4 shows a pair of lower blades 18 and 19 working with a double-edge upper blade or die 20 that can cut workpieces 21 so that burrs 23 at both edges point in the same direction. This trimming cuts out a waste piece 22, but leaves a workpiece 21 which can be rolled to form a tube that is subsequently welded into pipe, with a cylindrical mandrel replacing the table 3 of FIG. 1.

I claim:

1. A method of joining fusible metal sheet edges, the method comprising the steps of sequentially:

forming each of the edges with a laterally projecting burr;

butting the edges together at a join line with both the burrs directed in the same lateral direction adjacent each other but with some small gaps remaining between the butted edges;

plastically deforming the laterally projecting burrs at the join line in the lateral direction opposite their projection direction and thereby closing the gaps; and directing a laser beam at the join line and thereby fusing the edges together at the join line.

2. The joining method defined in claim 1 wherein the burrs are plastically deformed by pressing them with a roller that is moved along the join line.

3. The joining method defined in claim 2 wherein the roller is barrel-shaped.

4. The joining method defined in claim 1 wherein the edges ar formed with burrs by shearing.

5. The joining method defined in claim 4, further comprising the step of trimming the sheared edges to form the burrs.

6. The joining method defined in claim 4, further comprising the step of trimming two sheared edges to form burrs thereon simultaneously.

7. The method defined in claim 6, further comprising the step of:

inverting one of the edges relative to the other edge prior to butting same together so that the burrs of both butted edges point in the same direction.

8. A method of joining fusible metal sheets, the method comprising the steps of sequentially:

shearing the sheets to form a pair of sheet edges each with a laterally projecting burr;

butting the edges together at a join line with both the burrs directed in the same lateral direction adjacent each other but with some small gaps remaining between the butted edges and supporting the side of the workpieces at the join line opposite the burrs on a support;

plastically deforming the laterally projecting burrs at the join line in the lateral direction opposite their projection direction by pressing the burrs toward the support and thereby pressing the burrs into the gaps to close same; and directing a laser beam at a join line and thereby fusing the edges together at the join line.

* * * * *